R. A. BOWEN.
DIRECTION INDICATING ATTACHMENT FOR DRILLING MACHINES.
APPLICATION FILED APR. 25, 1914.
1,131,596.
Patented Mar. 9, 1915.
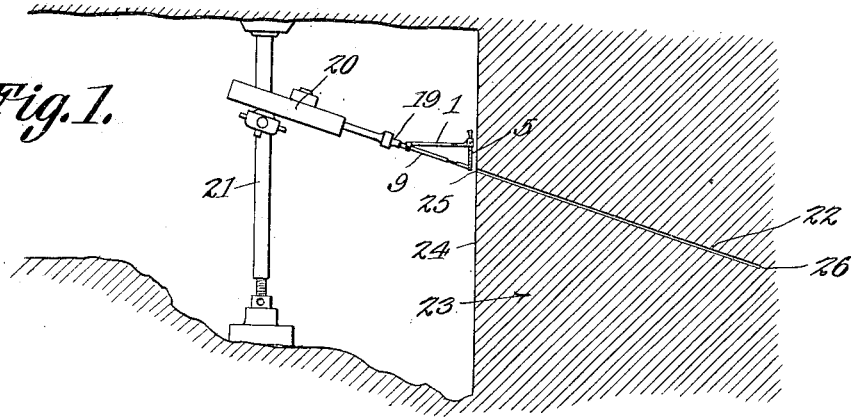
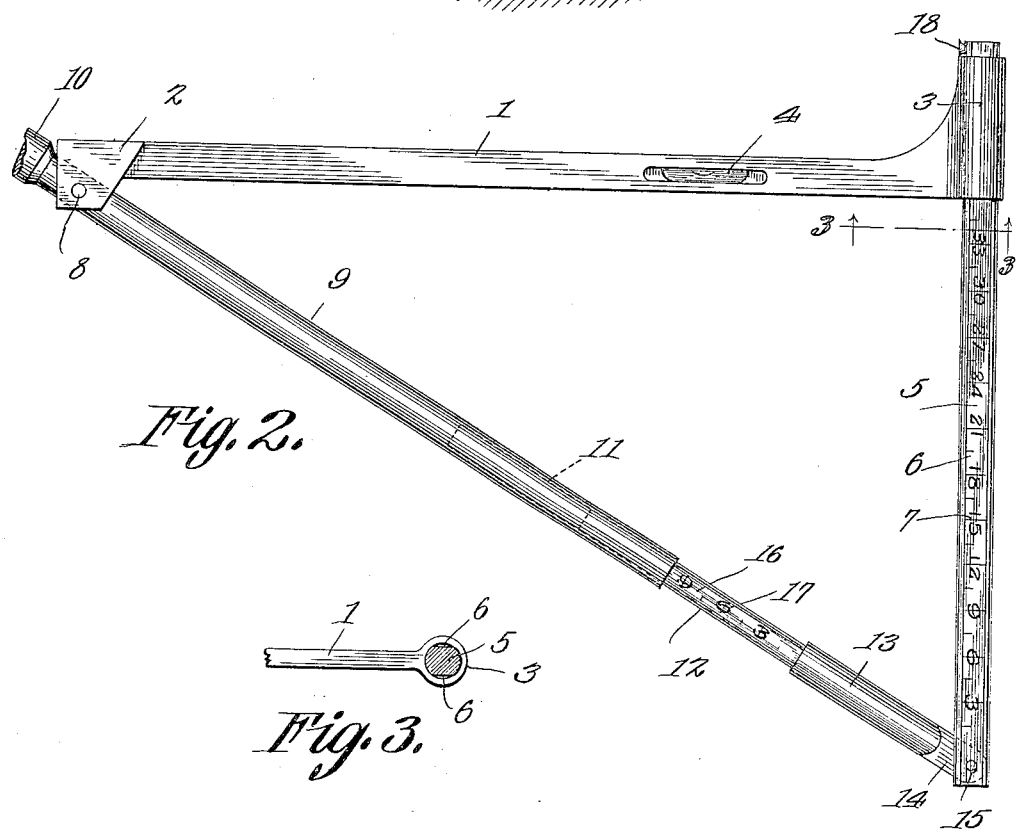
WITNESSES
F. B. Wooden.
F. T. Chapman.
INVENTOR,
R. A. Bowen
BY
[signature]
ATTORNEY

UNITED STATES PATENT OFFICE.

ROY ADDISON BOWEN, OF COMMONWEALTH, WISCONSIN.

DIRECTION-INDICATING ATTACHMENT FOR DRILLING-MACHINES.

1,131,596.   Specification of Letters Patent.   Patented Mar. 9, 1915.

Application filed April 25, 1914.   Serial No. 834,425.

*To all whom it may concern:*

Be it known that I, Roy A. Bowen, a citizen of the United States, residing at Commonwealth, in the county of Florence and State of Wisconsin, have invented a new and useful Direction-Indicating Attachment for Drilling-Machines, of which the following is a specification.

This invention has reference to improvements in direction indicating attachments for drilling machines, and its object is to provide a device showing to the operator of a drilling machine the exact position of any proposed drill hole to be driven at any angle with the face of the ground into which he is drilling.

The invention comprises an instrument provided with means for securing it to the chuck of the drilling machine in place of the drill rod, and with graduations so arranged that by holding one side of the device parallel with the plane the operator is figuring from, and moving the other side to make any desired angle to such plane, the proper angle for drilling is at once indicated. If the operator is using a drill six feet long, and is drilling horizontally inward from an upright face he knows that the bottom of the hole is six feet from the upright face; but, if the hole be driven at an angle with the upright face the operator does not know how far horizontally the bottom of the hole is from such face, nor does he know how far the bottom of the hole is from the collar of the drill hole, so that he does not know the position of the bottom of the hole with reference to the working face. With the device of the present invention such distances are very easily read and the operator is saved the trouble and time of estimating and measuring the distances. With the device of the present invention the operator is enabled to indicate at once the direction of drilling of a hole in order that the bottom of the hole may be at certain distances from the working face and from an open face if such be present. The device is also readily adaptable of graduation for different lengths of drills, such as are customarily employed.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a more or less schematic view showing the operation of the invention. Fig. 2 is an elevation of a device embodying the invention. Fig. 3 is a section on the line 3—3 of Fig. 2.

Referring to the drawings, and more particularly to Figs. 2 and 3, there is shown an instrument comprising a bar 1 terminating at one end in ears 2, and at the other end in a sleeve 3, the latter having its bore perpendicular to the length of the bar 1. Mounted in the bar 1 is a level glass 4, but it will be understood that any suitable number of such glasses may be used as may be found desirable.

Slidable through the sleeve 3 is a rod 5 having planed faces 6, these planed faces being indicated in Fig. 3 as on opposite sides of the bar, but any arrangement may be employed that may be found desirable. The faces 6 are provided for graduations 7.

Pivoted between the ears 2 by a pivot pin 8 is a rod 9 having on one side of the pivot a prolongation 10 and at the end remote from the prolongation 10 this rod is formed with an axial socket 11 designed to receive a portion 12 of reduced diameter of another rod 13 corresponding to the rod 9. The rod 13 has an end 14 remote from the reduced portion flattened or otherwise shaped for attachment to the corresponding end of the rod 5, this attachment being by way of a pivot pin 15. The portion 12 of the rod 13 is planed or otherwise arranged, as indicated at 16, for the reception of graduations 17. The portion 12 of the rod 13 readily telescopes in the socket 11, while the rod 5 is capable of sliding through the sleeve 3 and is held from escaping therefrom by a stop pin 18 at the end remote from the pivot pin 15.

The end 10 of the rod 9 is of a size, shape and length to be received in the chuck end 19 of a drilling machine 20, and in the particular instance shown this drilling machine is mounted on a post 21 such as is customarily employed in a stope, but is to be taken as indicative of any suitable support for the drilling machine permitting adjustments of the machine to any desired angular position.

In the showing of Fig. 1 a drill hole 22 is shown in material 23 being worked, and this drill hole is indicated as at an angle to an upright face 24.

Suppose that the drill hole is already formed and it is desired to ascertain the distance along the surface 24 that the collar 25 of the drill hole is from the bottom 26 of such hole. For this purpose the end 10 of the rod 9 is introduced into the chuck 19 with the rod 9 and its continuation 13 in line with the drill hole and the bar 1 is brought to a level, this bringing the rod 5 parallel with the face 24.

The structure of the present invention is made proportional to the length of the drill rods and the graduations 7 and 17 are so related to the length of the drill rod for which they are intended that the desired information is read directly from the graduations. For instance, the distance of the end 26 from the collar 25 measured along the wall 24 is read on the rod 5, while the increased length of a drill hole to reach the same horizontal distance from the surface 24 as a horizontal drill hole, is indicated by the graduations 17.

If the drill hole has not yet been made, but the operator wishes the bottom of the hole to occupy a certain position with relation to the face 24, or to an open face perpendicular to the face 24, then by securing the end 10 in the chuck 19 and bringing the bar 1 to a level with the rod 5 parallel with the face 24, the rod 5 is moved along the sleeve 3 and the rod 9 is moved about the pivot 8 until the graduations 7 and 17 read as desired, the drilling machine 20 being moved on its supporting members to the angle represented by the inclination of the rods 9 and 13. Now with the machine at such an angle and the proper length of drill rod the operator is assured that the bottom of the drill hole will reach the desired point.

What is claimed is:—

1. A device for the purpose described, comprising a triangular frame having one side pivotally connected to the other side and pivotally connected to the end of the triangular frame, said end being in turn slidable in the second-named side, and the first-named side being variable as to length, said first-named side being also prolonged beyond the frame and there provided with means for attachment to the drill chuck of a drilling machine.

2. A device for the purpose described, comprising a triangular frame having an end member adjustable in one side member in a direction perpendicular to the length of said side member and the other side member pivoted to the first-named side member and to the end member and variable as to length, both the end member and the variable side member having graduations, and the variable side member having a prolongation beyond its connection to the other side member and there adapted for introduction into the drill chuck of a drilling machine.

3. A device for the purpose described comprising a right angle frame with the hypotenuse member formed of parts telescoping one in the other and pivotally connected to the outer ends of the other two members, one of said other two members being slidably connected to the other of said members for varying its effective length, both the slidable member and the hypotenuse member having graduations, and the hypotenuse member being provided with a prolongation at the end remote from the slidable one of the other two members, said prolongation being adapted to the tool chuck of a drilling machine.

4. A device for the purpose described comprising a right angle frame consisting of a side of fixed length having ears at one end and a guiding sleeve at the other perpendicular to the length of said side, level indicating means on said side, a bar having graduations thereon and slidable in the sleeve and constituting a second one of the members of the triangular frame, and a telescoping hypotenuse member pivotally connected to the slidable member and pivoted between the ears of the first-named side with graduations at the telescoping portion, and said hypotenuse member having a continuation beyond the ears to which it is pivoted adapted for introduction into the tool chuck of a drilling machine.

5. A device for the purpose described, comprising a right angle frame having one side of fixed length and the other side and hypotenuse of variable length and adjustable with relation to the fixed member to vary the angle of the hypotenuse with respect to said sides, both the adjustable side and the hypotenuse being provided with graduations, and the hypotenuse having means for attachment to a drilling machine in the line of drilling, the graduations being proportional to the lengths of drill rods employed.

In testimony, that I claim the foregoing as my own, I have hereto affixed my signature in the presence of two witnesses.

ROY ADDISON BOWEN.

Witnesses:
 MAX SELLS,
 ANNA JUDGE.